No. 725,160. PATENTED APR. 14, 1903.
I. D. SMEAD.
HOT WATER HEATING APPARATUS.
APPLICATION FILED AUG. 15, 1902.
NO MODEL. 2 SHEETS—SHEET 2.

UNITED STATES PATENT OFFICE.

ISAAC D. SMEAD, OF CINCINNATI, OHIO.

HOT-WATER HEATING APPARATUS.

SPECIFICATION forming part of Letters Patent No. 725,160, dated April 14, 1903.

Application filed August 15, 1902. Serial No. 119,752. (No model.)

*To all whom it may concern:*

Be it known that I, ISAAC D. SMEAD, a citizen of the United States, residing at Cincinnati, in the county of Hamilton and State of Ohio, have invented certain new and useful Improvements in Hot-Water Heating Apparatus, of which the following is a specification.

My present invention pertains to improvements in hot-water heating apparatus, the construction and advantages of which will be hereinafter set forth, reference being had to the annexed drawings, wherein—

Figure 1:
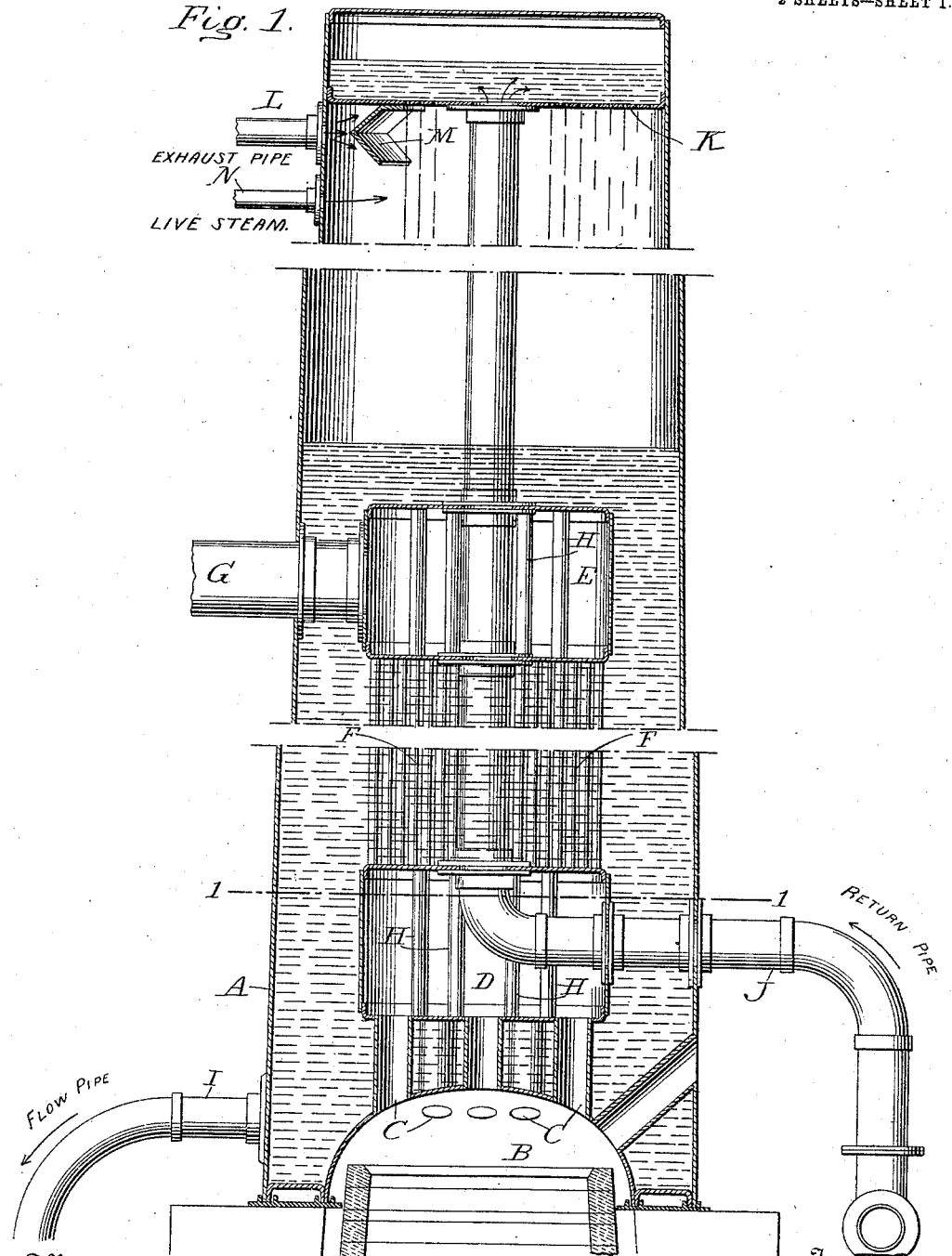
Figure 2:
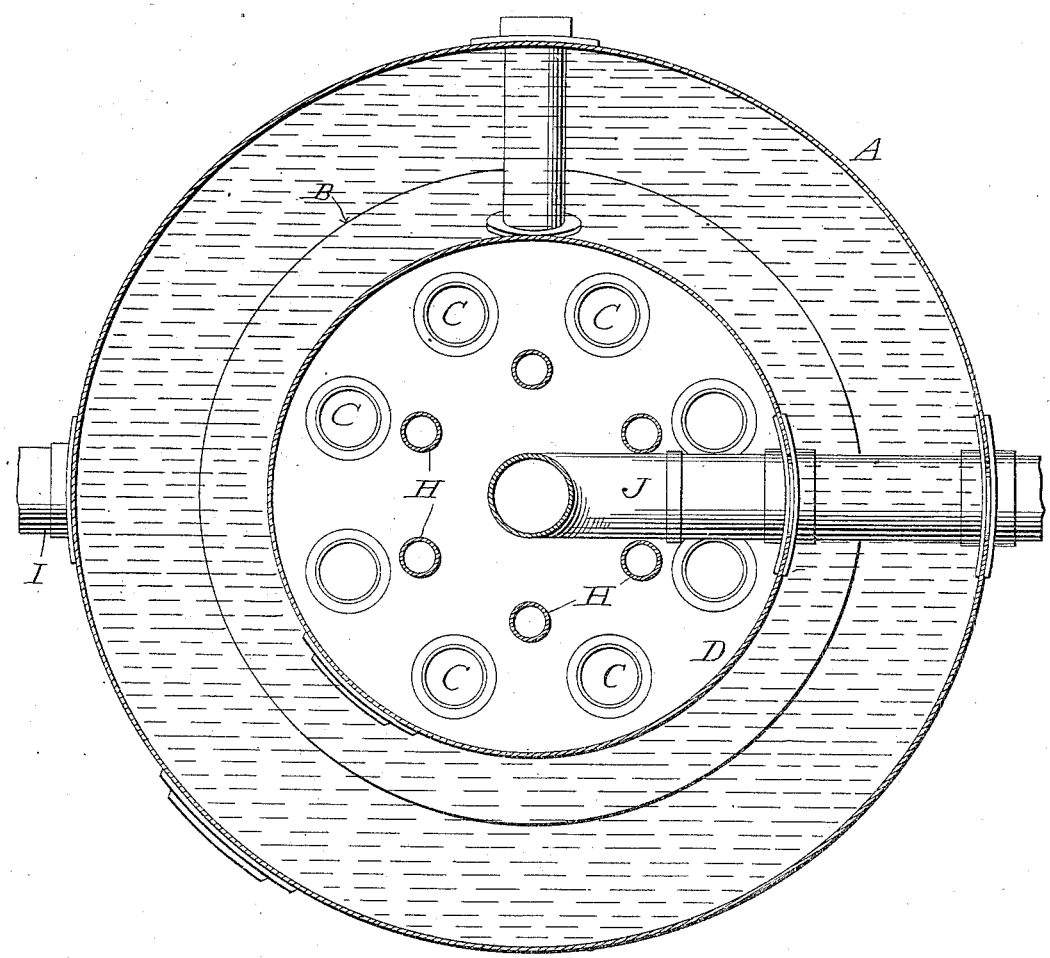

Figure 1 is a vertical sectional view of the boiler, and Fig. 2 a transverse sectional view on the line 1 1, Fig. 1.

The object of the present invention is to provide a boiler designed to heat a large body of water for heating purposes, and to so construct said boiler that the water which flows through the same may be readily heated, either by the application of exhaust-steam, live steam, by a furnace fire, or a combination of any or all of these means. The boiler is designed primarily to be used in so-called "central-heating" plants, wherein one or more large boilers are employed to heat a large body of water which is pumped out through a heating system (usually a large number of radiators, heating-coils, or the like) and thence back to the boiler at the central station. It is of course desirable to heat the body of water as economically as possible and to provide a ready means for imparting a greater or less degree of heat according to climatic requirements. With the boiler shown in the accompanying drawings provision is made for heating the water by any or all of the methods or means above noted.

A designates the boiler shell or casing, mounted over a fire-chamber B, which is directly below the arched or dome-shaped lower boiler-section. Fire-tubes C extend upwardly from this portion into a drum D, which in turn communicates with a second drum E through a series of flues or passages F. A smoke pipe or flue G extends laterally from the drum E out through the side of the boiler. Water-tubes H extend through the drums D and E, as shown in both views. I denotes the flow-pipe, from which the water passes or is pumped throughout the heating system. The return-pipe J extends into the boiler near the lower end in line with drum D, into which it passes through the side wall thereof. Within said drum the pipe turns and passes directly upward, out through the top of the drum, then up through drum E, finally discharging the cooled water above a perforate diaphragm K, mounted within the boiler near the upper end thereof. The water as it passes from the pipe spreads out over the diaphragm and drops down through the openings therein.

At a point below the diaphragm an exhaust-steam pipe L opens into the boiler, a deflector M being located in line therewith to diffuse the steam and cause it to act more nearly equally in all parts of the upper portion of the boiler upon the water which passes down through the diaphragm. A live-steam pipe N also opens into the boiler at a point near the upper end thereof, and the steam passing therefrom may likewise be employed to heat the water as it passes through the diaphragm.

It is manifest that live and exhaust steam may be employed conjointly or separately, as desired or found expedient.

Having thus described my invention, what I claim is—

1. In a heating plant, the combination of a boiler; a furnace located beneath the same; a series of fire-drums located within the boiler and connected to each other and the furnace by a series of flues; an outflow-pipe for the heated water; a perforate diaphragm mounted in the upper end of the boiler; a return-pipe for the water, said return-pipe passing through the fire-drums and discharging above the diaphragm; and means for introducing steam into the boiler below the diaphragm.

2. In a heating plant, the combination of a boiler; a furnace located beneath the same; a series of fire-drums located within the boiler and connected to each other and the furnace by a series of flues; an outflow-pipe for the heated water; a perforate diaphragm mounted in the upper end of the boiler; a return-pipe for the water, said return-pipe passing through the fire-drums and discharging above the diaphragm; a deflector secured to the under face of the diaphragm; and exhaust and live steam pipes connected to the boiler in approximate alinement with the deflector.

In testimony whereof I have signed my name to this specification in the presence of two subscribing witnesses.

ISAAC D. SMEAD.

Witnesses:
C. C. BURDINE,
HORACE A. DODGE.